Sept. 21, 1965 O. B. THRASHER 3,207,455

REEL THREADING DEVICE

Filed Aug. 14, 1963

ORA B. THRASHER
INVENTOR.

BY

Victor J. Evans & Co.
Attorneys

United States Patent Office 3,207,455

Patented Sept. 21, 1965

3,207,455

REEL THREADING DEVICE

Ora B. Thrasher, 450 Longfellow, St. Louis 22, Mo.

Filed Aug. 14, 1963, Ser. No. 302,044

1 Claim. (Cl. 242—74.2)

Figures 1, 2, 3, 4, 5:
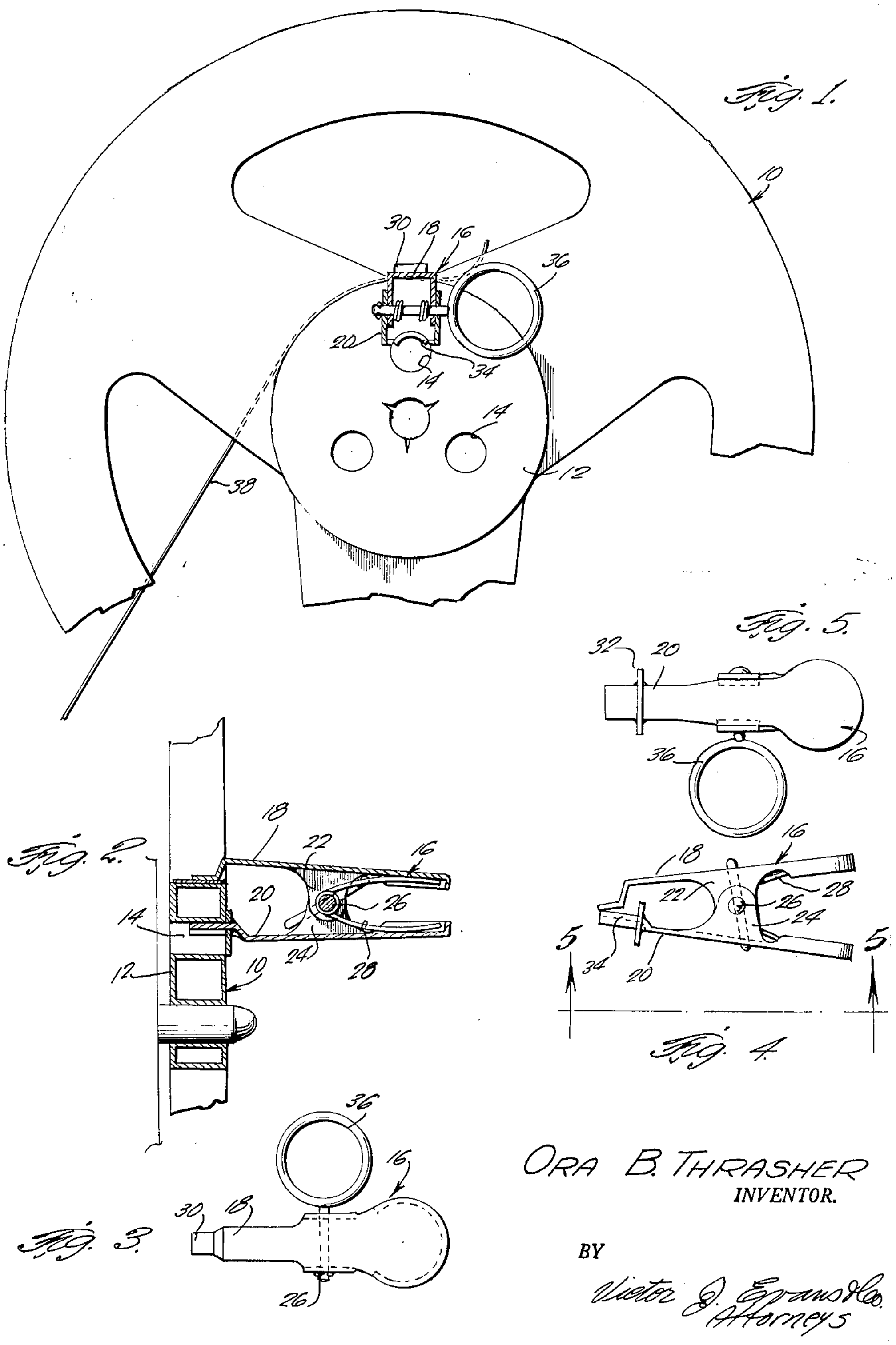

The present invention relates to reels such as are employed for recording tapes, films, or the like and in particular to a threading device for such a reel.

Commonly in use are reels having hubs about which are wound film, magnetic tape, or the like. Because of the size of such tape and the width of the reel, threading of the tape onto the reel is a difficult and annoying task. Many devices have been proposed for attaching the tape to the reel but such devices are not always the most desirable as when the reel is wound or unwound, such devices limit the usefulness of the tape or film and necessitates stopping the reel before the end is reached otherwise the tape or film is broken.

The object of the present invention is to provide a device for quickly and easily threading a tape or film onto a reel in which there are apertures adjacent to the hub.

Another object of the present invention is to provide on such a device means by which the reel may be spun on its spindle for winding the tape or film thereon.

A further object of the present invention is to provide a reel threading device which is adapted for use on any type of reel having a hub with an aperture adjacent the hub, such device being sturdy in construction and having long life characteristics, such device being inexpensive to manufacture and assemble, and such device being highly effective in action.

These and other objects and advantages of the present invention will be fully apparent from the following description when taken in connection with the anexed drawing, in which:

FIGURE 1 is an end view of a reel with a portion broken away showing the device of the present invention securing the end portion of a tape or film to the reel, FIGURE 2 is a view partially in section showing the device in use, FIGURE 3 is a plan view of the device removed from the reel, FIGURE 4 is a side elevational view, and FIGURE 5 is a view taken on the line 5—5 of FIGURE 4.

In FIGURES 1 and 2, the numeral 10 designates a reel having a hub 12 about which are apertures 14.

The device of the present invention is designated generally by the numeral 16 and it consists in a first jaw 18 and a second jaw 20 movable toward and away from the first jaw 18. The sides of the jaw 18 are formed with tabs 22 which are received between tabs 24 formed on the sides of the jaw 20. A pivot pin 26 extends between the tabs and secures the jaws 18 and 20 for rocking movement relative to each other.

A spring 28 has its ends bearing against the handle portions of the jaws 18 and 20, as shown in FIGURE 2, and biases the jaws 18 and 20 toward each other.

As shown in FIGURE 3 the jaw 18 has a knurled nose portion 30 while in FIGURE 5 it will be seen that the jaw 20 has an abutment member 32 inwardly of the free end. Also, as shown in FIGURES 1 and 4, the free end portion of the jaw 20 is arcuately curved, as at 34. One end of the pin 26 is formed to a ring 36 which forms a grip means for the finger of the hand of a user and the device 16 is secured as in FIGURE 1. The reel 10 may be spun about its spindle using the ring 36 as a grip means.

In use, the arcuately curved end portion 34 of the jaw 20 is inserted in one of the apertures 14 and the other jaw 18 is positioned so that its end portion 30 overlies the end portion of a tape or film 38 and secures the same to the hub 12.

This makes it easy and simple for a person to attach the tape or film 38 to the reel 10, the device 16 being readily and quickly handled into and out of position and preventing the reel 10 to be spun to wind up the tape a few turns before removing the device for future use.

While only a preferred embodiment or form of the present invention has been shown and described, other forms of the invention are contemplated and numerous changes and modifications may be made in the invention without departing from the spirit thereof as set forth in the appended claim.

What is claimed is:

For use with a reel having an apertured hub, a reel threading device comprising a first jaw, a second jaw movable toward and away from said first jaw, pivot means operatively connecting said first and second jaws together, abutment means on one of said jaws for engaging the end of a reel hub when said one jaw is inserted into an aperture of the hub, spring means mounted from said pivot means biasing said second jaw toward said first jaw, and a ring carried by said jaws, said ring mounted from said pivot means providing a grip for the end of a finger for spinning a reel when said device is engaged on the hub of the reel.

References Cited by the Examiner

UNITED STATES PATENTS

| | | | |
|---|---|---|---|
| 1,531,680 | 3/25 | Stenersen | 24—137.5 |
| 2,815,777 | 12/57 | Iraids. | |
| 2,859,920 | 11/58 | Flahan | 242—74.1 |
| 2,915,256 | 12/59 | Bruhn | 242—74.2 |
| 3,100,326 | 8/63 | Buck | 24—252 |
| 3,131,449 | 5/64 | Iida | 24—252 X |

FOREIGN PATENTS

| | | | |
|---|---|---|---|
| 714,990 | 9/54 | Great Britain. | |

MERVIN STEIN, *Primary Examiner.*

STANLEY N. GILREATH, *Examiner.*